United States Patent [19]

Struve

[11] 4,377,429

[45] Mar. 22, 1983

[54] WELDING OF PLASTICS MATERIAL

[75] Inventor: Friedrich Struve, Johannesburg, South Africa

[73] Assignee: Gundle Holdings (Proprietary) Limited, Edenvale, South Africa

[21] Appl. No.: 287,978

[22] Filed: Jul. 29, 1981

[30] Foreign Application Priority Data

Mar. 13, 1981 [ZA] South Africa ............. 81/1667

[51] Int. Cl.³ ............... B29C 27/02; B65H 69/08
[52] U.S. Cl. ................... 156/153; 156/157;
156/244.11; 156/244.23; 156/273.3; 156/304.1;
156/380.9; 156/499; 156/500; 156/509;
156/535; 156/546; 156/574; 156/578
[58] Field of Search ........... 156/73.5, 82, 153, 157,
156/244.11, 244.23, 304.1, 500, 508, 509, 535,
502, 546, 575, 574, 579, 499, 273.3, 380.9, 578

[56] References Cited

U.S. PATENT DOCUMENTS

| 2,220,545 | 11/1940 | Reinhardt | 156/82 |
| 2,377,018 | 5/1945 | Leguillon et al. | 156/73.5 |
| 2,736,045 | 2/1956 | Kamborian | 156/535 |
| 3,008,862 | 11/1961 | Haine et al. | 156/308.4 |
| 4,289,552 | 9/1981 | Hammer | 156/73.4 |

Primary Examiner—Michael G. Wityshyn
Attorney, Agent, or Firm—Sughrue, Mion, Zinn, Macpeak and Seas

[57] ABSTRACT

Welding surfaces of thermoplastics material together by depositing a continuous layer of molten thermoplastic welding material over adjacent areas of the surfaces to be joined, the deposition of at least part of the molten welding material being effected with a smearing action in which the material is subjected to shear forces acting across the surfaces, and allowing the deposited material to solidify.

15 Claims, 4 Drawing Figures

WELDING OF PLASTICS MATERIAL

This invention relates to the welding of thermoplastic materials and particularly, but not exclusively, to the welding of thermoplastic sheeting.

In this specification the invention is described with particular reference to the welding of thermoplastic sheet material. This description should not, however, be considered as a limitation on the scope of the invention or its application.

One known method of welding sheets of plastic material together comprises overlapping the sheets and covering the joint with a molten thermoplastic extrudate. When the extrudate solidifies it attaches to each sheet and effectively bridges the joint in a sealed manner. Generally the plastic sheet is preheated immediately prior to contact with the extrudate as this enables an extrudate of a lower temperature to be used and provides improved weld characteristics. The preheating is generally done by either hot air or by radiation from a source such as one or more halogen lamps.

A disadvantage of the use of hot air or a radiant heat source to provide the heat required is that they are not easily controlled, that is, the degree of preheating may vary from place to place with a resultant change in the strength or other characteristics of the weld. For example, a puff of wind could momentarily partially deflect a hot air blast and result in substantially no preheating at all at that particular location.

Although the above method works relatively well on plastic materials such as polyvinyl chloride (P.V.C.) considerable difficulty has been experienced in the welding of polythene for example. Thus, so-called "peel tests" carried out at elevated temperatures on polythene sheeting which has been welded indicate that the extrudate may simply peel off the polythene substrate as proper welding often does not take place. Peel tests comprise subjecting the weld to controlled peeling forces (as opposed to shearing forces) and these tests carried out at normal ambient temperatures frequently do not demonstrate that proper fusion has not taken place.

The inventor of this invention is also the inventor of the invention of South African Patent Application No. 81/1427. That invention relates to the heating by conduction of, and the damaging of, the thermoplastic surfaces prior to the deposition of the molten material.

It has been found that although the aforementioned invention works well, in some applications it has certain disadvantages of a practical nature.

An object of this invention is to provide a method and apparatus for the improved welding of thermoplastic material.

According to the invention a method of welding together surfaces of thermoplastic material comprises:
(a) depositing a continuous layer of molten thermoplastic welding material over adjacent areas of the surfaces to be joined, the deposition of at least part of the molten welding material being effected with a smearing action in which the material is subjected to shear forces acting across the surfaces to be joined; and,
(b) allowing the deposited material to solidify.

Further according to the invention the adjacent areas of the surfaces may be preheated prior to the deposition of the molten welding material; the preheating is provided by radiation or conduction or both and the adjacent areas may be superficially damaged during preheating or during deposition of the welding material or both.

Still further according to the invention the surfaces are formed by a pair of overlapping sheets of thermoplastic material, and the adjacent areas of the surfaces are the areas adjacent to an edge of one of the surfaces or those areas as well as areas between the two sheets and adjacent to the edge.

Further according to the invention the molten material is continuously mixed immediately prior to deposition.

The invention also provides an apparatus for the continuous welding of surfaces of thermoplastic material comprising:
means for depositing a continuous layer of molten thermoplastic welding material onto adjacent areas of the surfaces; and,
smearing means for subjecting the material to a smearing action relative to the surfaces during deposition.

Further according to the invention the apparatus includes means for superficially damaging the surfaces during deposition of the molten material, and said damaging means is integral with the smearing members.

According to a first aspect of the invention the apparatus includes a delivery tube terminating in a nozzle for the welding material and the smearing means comprises at least one rotatable member terminating in a smearing surface within the nozzle.

According to a second aspect of the invention the apparatus includes a rotatable delivery tube for the welding material, the delivery tube terminating in a transverse annular smearing surface within a nozzle.

Further according to the first and second aspects of the invention the position of the smearing surfaces is adjustable with respect to the surfaces being welded and the smearing surfaces include projections for superficially damaging the surfaces during use.

According to a third aspect of the invention the apparatus comprises a delivery tube and nozzle including means for causing the molten material to swirl transversely with respect of the surfaces being welded during deposition.

Three embodiments of the invention, described by way of example only, follow with the reference to the accompanying drawings in which.

Figure 1:
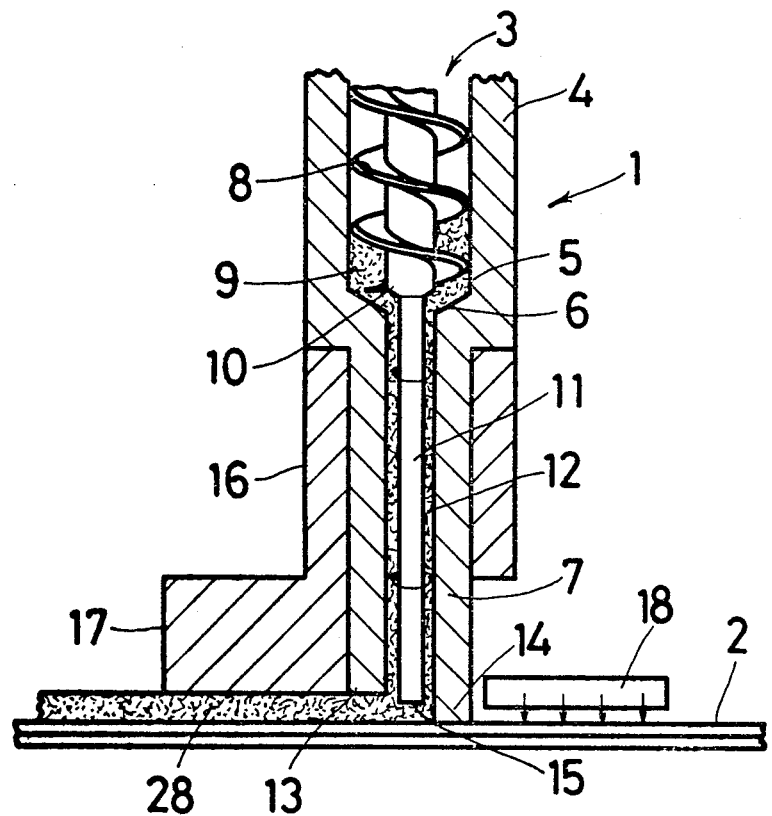
FIG. 1 is a sectional elevation of a first embodiment of welding apparatus according to the invention.

In the first embodiment of the invention as shown by FIG. 1, an apparatus 1 for use in the welding of overlapping sheets 2 of thermoplastic material such as polythene, for example, comprises an extruder indicated generally by numeral 3. This extruder 3 includes a barrel portion 4 which tapers down at its lower end 5 via a conically-shaped shoulder 6 into an elongated delivery tube 7 which is concentric therewith.

Within the barrel 4 is a screw-feeder 8 which is adapted to force molten thermoplastic welding material 9 through the delivery tube 7. Integral with this feeder 8 and at its lower end 10, is a rotatable member 11 of circular cross-section. This rotatable member 11 is concentric with the screw-feeder 8 and extends down the centre of the delivery tube to provide an annular passage 12 for the molten welding material between it and the inner wall of the delivery tube.

At the lower end of the delivery tube 7 there is a nozzle which enables the molten welding material to escape in a direction substantially transverse to the axis of the delivery tube. This nozzle is formed by making the trailing edge 13 of the delivery tube somewhat shorter than the leading edge 14.

The rotating member 11 terminates in a circular smearing surface 15 at a position midway between the leading and trailing edges of the delivery tube.

Along the major part of its length the delivery tube 7 is encased in an insulating sheath 16 of suitable heat resisting material as for example, that sold under the trade name "Teflon". At the trailing edge 13 of the delivery tube 7 the sheath 16 extends rearwardly to form a pair of guides 17 which bridge the molten material 28 extruded from the nozzle and support the apparatus on the sheets 2 being welded.

Forwardly of the leading edge 14 of the delivery tube 7 is a preheating device 18 for preheating the sheet material prior to welding as is well known in the art.

In use a pair of sheets of thermoplastic material, such as polythene for example, are overlapped by a small amount and the welding apparatus 1 is passed centrally along the overlapping edge of the uppermost sheet. As the apparatus moves along this edge, the areas of the sheet surfaces immediately adjacent the edge are preheated to just above the melting point of the thermoplastic material by the heating device 18. Immediately after preheating a layer of molten thermoplastic material is deposited onto these areas and over the aforementioned edge by the extruder.

From the drawing it will be appreciated that the screw-feeder 8 of the extruder 3 forces the molten thermoplastic welding material down through the delivery tube 7. As the material passes down this tube it is constantly mixed by the rotatable member 11 so that there is substantially no temperature gradient between the inner part of the mass of molten material and that part of the material immediately adjacent the delivery tube wall. This ensures that a relatively cool layer of molten material is not deposited immediately onto the sheet material as is the case with known machines.

As the molten material is extruded from the delivery tube 7 a large portion of it is subjected to the shearing forces caused by the rotating smearing surface 15. In this way some of the material is smeared onto the surfaces of the sheets and in all directions parallel thereto. It has been found that this smearing action provides a particularly good bond between the welding material 28 and the material being welded.

Figure 2:
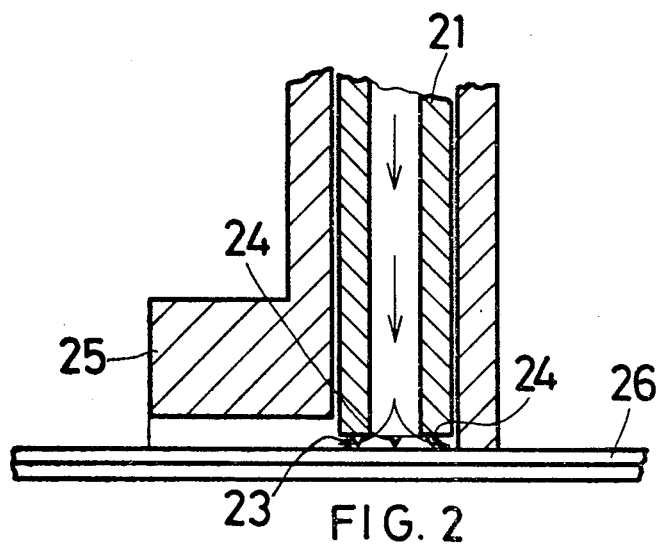
FIG. 2 is a sectional elevation of a second embodiment of welding apparatus according to the invention.

In a second embodiment of the invention as shown in FIG. 2. the apparatus has a hollow delivery tube 21 which rotates about its axis and terminates in a flat annular smearing surface 23 having projections 24 thereon.

The rotatable delivery tube 21 is encased in an insulating sheath of the same general type as that described in the first embodiment. This sheath however forms both the leading edge of the apparatus as well as the guide 25 at the rear thereof.

The apparatus of this embodiment is used in the same manner as that of the first embodiment and as it moves along the upper edge of the sheets of material 26 to be welded, molten thermoplastic welding material passes down the tube which in turn rotates about its axis.

When the welding material is emitted from the delivery tube it passes under the smearing surfaces 23 and is thus smeared across the adjacent preheated areas of the sheets which are damaged by the projections 24.

Figure 3:
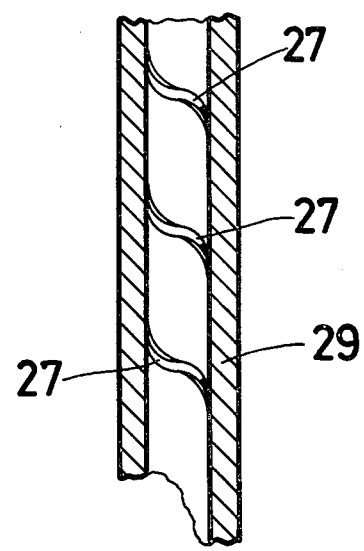
FIG. 3 is a sectional elevation of the delivery tube of a third embodiment according to the invention.

A third embodiment is shown in FIG. 3 of the drawings. In this embodiment there are no rotating parts but the internal configuration of the delivery tube 29 includes means in the form of helical guides 27 which act on the molten material and provide it with a swirling action as it passes therethrough.

Because of this swirling motion the material is again smeared across the surfaces of the sheets being welded as it is emitted from the nozzle at the end of the delivery tube.

Figure 4:
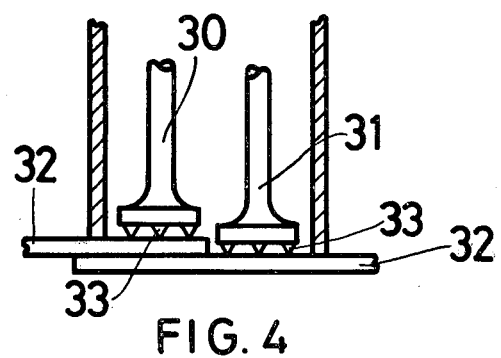
FIG. 4 is a sectional elevation of the shearing surfaces of a fourth embodiment.

A fourth embodiment of the invention is shown in FIG. 4 and is similar to the first embodiment. Instead of a single shearing surface, two adjacent rotating shearing surfaces 30 and 31 are provided, the one 31 being slightly lower than the other 30. This embodiment is intended to cater for the side action where relatively thick plastics sheets 32 are being welded together.

As indicated each of the surfaces 30 and 31 includes projection 33 for damaging the thermoplastic sheets.

Although the use of the apparatus of the above embodiment has been described in the welding of the upper surfaces only of the sheet material, it will readily be appreciated that welding material could easily be deposited simultaneously between the two sheets utilising an apparatus made in accordance with the invention.

Furthermore, it is envisaged that where the apparatus incorporates a smearing surface the distance between this surface and surfaces being welded could be adjustable so as to either decrease or increase the smearing and shearing action. The surfaces could also be on a rotatable member driven independently of the extruder of the apparatus.

Having now particularly described and ascertained my said invention and in what manner same is to be performed, I declare that what I claim is:

1. A method of welding together surfaces of thermoplastic material comprising:
    (a) depositing a continuous layer of molten thermoplastic welding material over adjacent areas of the surfaces to be welded together;
    (b) substantially simultaneously with the deposition of the welding material, circularly smearing a boundary layer of the welding material which is in contact with the surfaces to be welded onto the adjacent areas of the surfaces so that the welding material being smeared is subjected to shear forces transverse to the direction of deposition of the layer of welding material; and
    (c) allowing the layer of deposited thermoplastic welding material to solidify.

2. A method as claimed in claim 1 in which the adjacent areas of the surfaces are preheated prior to the deposition of the molten welding material.

3. A method as claimed in claim 2 in which the preheating of the adjacent areas of the surfaces to be welded is effected by at least one of radiation and conduction heating.

4. A method as claimed in claim 2 in which the adjacent areas of the surfaces to be welded are superficially damaged during at least one of preheating of the adjacent areas of the surfaces to be welded and deposition of the welding material.

5. A method as claimed in claim 1 in which the molten welding material is continuously mixed immediately prior to deposition.

6. A method as claimed in claim 1 in which the surfaces are formed by a pair of overlapping sheets of thermoplastic material.

7. A method as claimed in claim 1 in which the adjacent areas of the surfaces include the areas adjacent to an edge of one of the surfaces.

8. An apparatus for the continuous welding together of surfaces of thermoplastic material, comprising:
means for depositing a continuous layer of molten thermoplastic welding material onto adjacent areas of the surfaces; and, smearing means for circularly smearing a boundary layer of the welding material which is in contact with the surfaces to be welded onto the adjacent areas of the surfaces during the deposition of the welding material, so that the welding material being smeared is subjected to shear forces transverse to the direction of deposition of the layer of welding material.

9. An apparatus as claimed in claim 8 which includes means for superficially damaging the adjacent areas of the surfaces during deposition of the molten material.

10. An apparatus as claimed in claim 9 in which said damaging means is integral with the smearing means.

11. An apparatus as claimed in claim 8 which includes a delivery tube for the welding material and which terminates in a nozzle for depositing the welding material, and the smearing means comprises at least one rotatable member terminating in a smearing surface within the nozzle.

12. An apparatus as claimed in claim 8 which includes a rotatable delivery tube for the welding material, the delivery tube terminating in a transverse annular smearing surface within a nozzle.

13. An apparatus as claimed in either of claims 11 or 12 in which the position of the smearing surface is adjustable with respect to the surfaces being welded.

14. An apparatus as claimed in claim 11 in which the smearing means comprises two adjacent rotatable members each terminating in a smearing surface.

15. An apparatus as claimed in claim 8 which comprises a delivery tube and nozzle including means for causing the molten material to swirl transversely with respect to the surfaces being welded during deposition.

* * * * *